(12) United States Patent
Seidel et al.

(10) Patent No.: US 8,504,321 B2
(45) Date of Patent: Aug. 6, 2013

(54) METHOD AND DEVICE FOR DETERMINING ONE OR MORE ROTATIONAL SPEEDS OF A TURBOCHARGING DEVICE, IN PARTICULAR FOR AN INTERNAL COMBUSTION ENGINE

(75) Inventors: Juergen Seidel, Esslingen (DE); Alex Grossmann, Leonberg (DE); Bernhard Opitz, Leonberg (DE); Dirk Hofmann, Stuttgart (DE); Jochen Laubender, Markgroeningen (DE); Uwe Kassner, Moeglingen (DE); Dirk Eichel, Bietigheim-Bissingen (DE); Klaus Lerchenmueller, Rettenberg (DE); Juergen Wendt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 430 days.

(21) Appl. No.: 12/782,415

(22) Filed: May 18, 2010

(65) Prior Publication Data
US 2010/0332180 A1    Dec. 30, 2010

(30) Foreign Application Priority Data

May 20, 2009 (DE) .......................... 10 2009 003 289
Aug. 17, 2009 (DE) .......................... 10 2009 028 576
Mar. 26, 2010 (DE) .......................... 10 2010 003 347

(51) Int. Cl.
*G01P 3/44* (2006.01)

(52) U.S. Cl.
USPC ............. 702/145; 702/96; 702/142; 702/147; 73/114.25

(58) Field of Classification Search
USPC    702/34, 40, 94, 96, 142, 145, 147; 73/114.25
See application file for complete search history.

(56) References Cited

U.S. PATENT DOCUMENTS

| | | | | |
|---|---|---|---|---|
| 3,878,520 A | * | 4/1975 | Wright et al. | 342/368 |
| 4,903,645 A | * | 2/1990 | Borger | 123/184.61 |
| 2010/0011868 A1 | * | 1/2010 | Cox | 73/660 |

* cited by examiner

*Primary Examiner* — Mohamed Charioui
*Assistant Examiner* — Paul D Lee
(74) *Attorney, Agent, or Firm* — Kenyon & Kenyon LLP

(57) ABSTRACT

A method is described for determining information about a rotational speed of a compressor, in particular a turbocharger, by providing a measuring signal, in particular a microwave measuring signal, which is directed at a compressor impeller of the compressor, so that the measuring signal is reflected on revolving blades of the compressor impeller, detecting the measuring signal reflected by one or more blades, and determining the information about the rotational speed as a function of the reflected measuring signal.

16 Claims, 8 Drawing Sheets

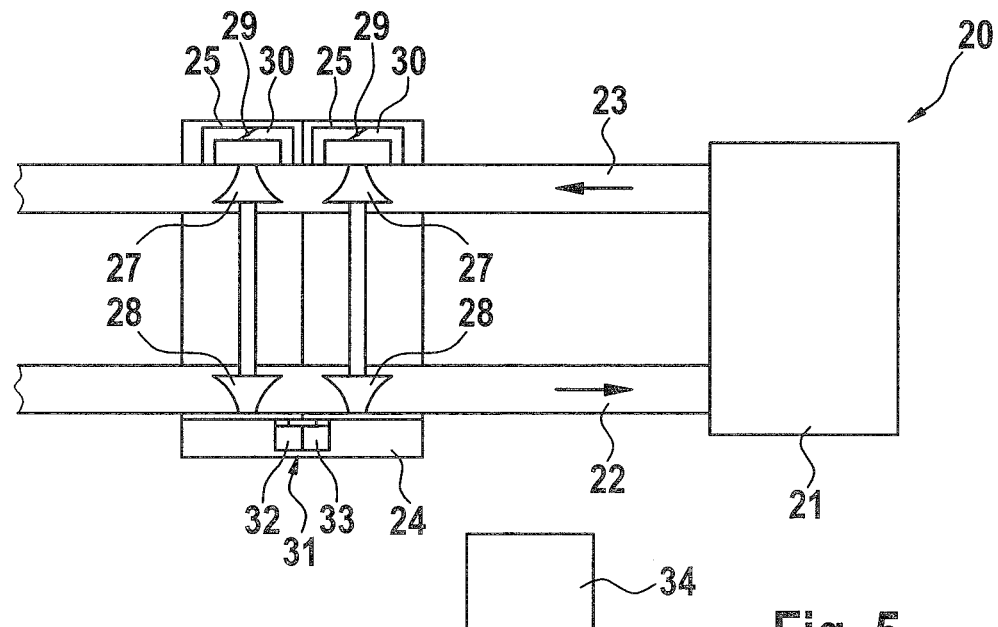
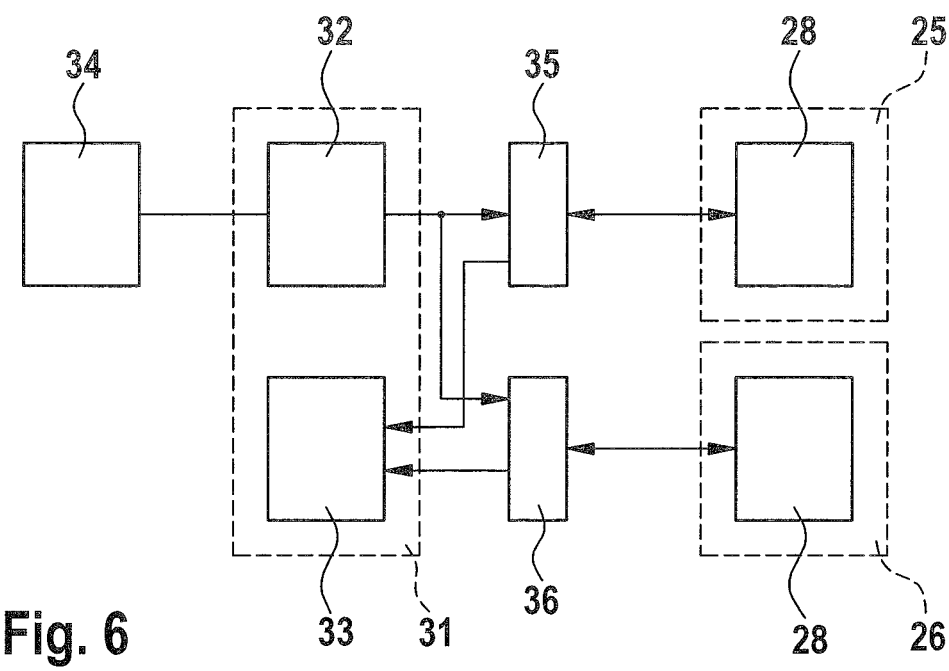

METHOD AND DEVICE FOR DETERMINING ONE OR MORE ROTATIONAL SPEEDS OF A TURBOCHARGING DEVICE, IN PARTICULAR FOR AN INTERNAL COMBUSTION ENGINE

RELATED APPLICATION INFORMATION

The present application claims priority to and the benefit of German Patent Application No. 10 2009 003 289.4, which was filed on May 20, 2009, German Patent Application No. 10 2009 028 576.8, which was filed on Aug. 17, 2009, and German Patent Application No. 10 2010 003 347.2, which was filed on Mar. 26, 2010, the disclosures of which are incorporated herein by reference.

FIELD OF THE INVENTION

The present invention relates to turbocharging devices for internal combustion engines, in particular methods and devices using which one or more rotational speeds of a turbocharging device may be determined.

BACKGROUND INFORMATION

Compressors, e.g., turbochargers, are used in motor vehicles for supercharging internal combustion engines to increase power. Turbochargers therefore have a high-speed compressor impeller having blades which draw air in from the environment and feed it at a higher pressure into an air system of the internal combustion engine.

The compressor impeller is driven by a turbine located in the exhaust line of the internal combustion engine and drives the compressor impeller as a function of the exhaust gas enthalpy. The air supplied at a higher pressure in the air system of the internal combustion engine results in a greater charge in the combustion chamber and thus in greater torque and power at the same volume.

Exhaust gas turbocharging is being used increasingly today to increase power and also to reduce fuel consumption by downsizing. In the latter case, the increased power is utilized to reduce the displacement and thus reduce the size of the entire internal combustion engine and lengthen the transmission. The reduction in fuel consumption results on the one hand from the shift in the operating points of the engine into ranges of more efficient combustion and on the other hand from a reduced friction due to the compact design and the reduced engine speed.

It is characteristic of the exhaust gas turbocharger that the rotor assembly having the turbine, the compressor and the shaft connecting the turbine and the compressor impeller is able to rotate completely unbraked. The rotational speed of the rotor assembly is obtained as a function of the enthalpy of the exhaust gas mass flow and the power absorbed by the compressed air. The rotational speed is so high at the operating point having a high compression ratio and/or a high volume flow that the centrifugal forces at the circumference of the compressor impeller may result in deformation of the blades of the compressor impeller. The compressor impeller and other high-speed components of the turbocharger are therefore highly susceptible to wear and material fatigue, so the lifetime of the turbocharger depends on its operating conditions to a great extent.

If the turbocharger is operated near the pumping limit or in the pumping state, the blades of the compressor impeller may be excited to mechanical vibrations, which may cause permanent damage to the compressor impeller if the load is too high or if there is a continuous load. The vibrations of the blades cause material fatigue more rapidly and ultimately cause fatigue fractures, so that the lifetime of the turbocharger is greatly impaired when pumping states occur. Frequent operation of a turbocharger at an excessive rotational speed, at which the outer ends of the compressor blades are able to achieve very high velocities, results in a definitely increased material fatigue and thus a reduced lifetime.

Manipulations involving the engine system in particular in tuning the vehicle to increase power may result in the turbocharger frequently being operated at an excessive speed. This is an abuse of the turbocharger because it significantly shortens its lifetime. If the turbocharger is defective, the manufacturer incurs high costs, it being difficult to prove abuse.

In addition, wear phenomena occur on the bearings of the turbocharger during operation of the turbocharger, resulting in changes in the uniformity of rotation over the lifetime of the turbocharger. The rate of wear on the individual components of the turbocharger depends on the operating states during the operating time of the turbocharger. The degree of wear determines the remaining lifetime.

Since damage to the compressor impeller should be prevented, it is advisable to monitor the rotational speed of the compressor impeller and it is necessary to ensure that the rotational speed range in which the compressor impeller is damaged is never reached. In traditional internal combustion engines for passenger vehicles, the rotational speed of the compressor impeller is not usually determined directly but instead is derived from thermodynamic variables, typically the pressure ratio and the volume flow through the compressor. Operating characteristics of the compressor, which are usually subject to scattering within a series, are used here.

Furthermore, the detection or modeling of the variables (pressure, temperature of the mass flow and the like) required for this purpose is itself subject to tolerance. To take this into account, a safety margin from the maximum allowed rotational speed is usually defined, but this means that the potential of the turbocharger is never fully utilized. Furthermore, the turbocharger must be designed with larger dimensions so that it has an inferior response in low power ranges, in particular at low engine speeds. The goal must therefore be to operate the turbocharger as close to its limit speed as possible.

On the other hand, other defects in the engine system may result in failure of the indirect determination of rotational speed as described above. For example, if a rotational speed of the turbocharger is determined that is too low when a leak occurs downstream from the compressor, thereby increasing the volume flow, but the engine control cannot detect this accurately or at all, depending on the sensor configuration. In addition, blockage of the air filter may result in a pressure drop upstream from the compressor and thus an increased compression ratio at the same air mass flow and thus result in an increased rotational speed of the turbocharger. It is therefore advisable to measure the rotational speed of the turbocharger directly to avoid the disadvantages described above.

Methods are already known which are based in principle on detection of a rotational speed of the compressor impeller by measuring the frequency at which the blades of the compressor impeller pass by a sensor element. The sensor element is situated close to the blades and detects the passing blades by detecting an inductive change in a resistance or a current flow as a response to the interruption in a magnetic field of a permanent magnet as the blades of the turbocharger pass by it.

This method of ascertaining the rotational speed has the disadvantage that due to the high temperatures in the compressor, the available sensors are not suitable because they may be sensitive to temperature. Furthermore, the available installation space on the compressor housing is very limited, so that installation of a corresponding sensor close to the blades of the compressor impeller is limited in particular in small turbochargers. The adjustment when using the measurement principles mentioned above is also demanding because under some circumstances there are requirements concerning the positioning of the sensor in the submillimeter range.

Two-stage turbocharging devices are increasingly being used in engine systems. Two turbocharging units (compressor stages) are situated here in series, or in parallel to one another, often having different compressor capacities. The compressor stage having the lower compressor capacity has a lower inertia and is used to take over the charging at low engine loads, e.g., at the start of acceleration of a vehicle. Therefore, because of its faster response time, a rapid buildup of the charging pressure is made possible and it is possible to respond rapidly to rapid changes in torque demand by the internal combustion engine. Meanwhile, the compressor stage having the higher compressor capacity may be switched to inactive mode by a bypass valve. Then the compressor stage having the high compressor capacity subsequently assumes the function of providing the corresponding high air mass flow with an increase in engine load. The compressor stage having the low compressor capacity is then bypassed by another bypass valve and therefore switched to inactive mode. Controlling the bypass valve, which is necessary for adjusting the corresponding compressor capacities, requires knowledge of the rotational speed of the individual turbocharging units of the compressor stages. However, providing individual rotational speed measurements is complex because of the limited installation space and because of the turbocharging devices being situated close to one another locally in such a multistage charging system.

SUMMARY OF THE INVENTION

An object of the exemplary embodiments and/or exemplary methods of the present invention is to make available a method and a device for reliable and robust determination of a rotational speed of a turbocharging unit. The object of the exemplary embodiments and/or exemplary methods of the present invention is in particular to make available a method and a device for reliable and robust determination of a rotational speed in a turbocharging unit in a multistage turbocharging system.

These objects may be achieved by the method for determining a rotational speed of a compressor as described herein and by the device as described herein.

Additional embodiments of the present invention are also described herein.

According to a first aspect, a method is provided for determining information about a rotational speed of a compressor, in particular a turbocharger, having the following steps:

providing a microwave measuring signal, which is directed at a compressor impeller of the compressor, so that the microwave measuring signal is reflected on revolving blades of the compressor impeller;

detecting a microwave measuring signal reflected by one or more blades;

determining information about the rotational speed as a function of the reflected microwave measuring signal.

One idea of the above method is to obtain a reflected measuring signal, which depends on a blade of the compressor impeller of the compressor passing by a sensor with the aid of an electromagnetic microwave measuring signal, the amplitude, intensity or other described variable of the reflected measuring signal being obtained as information about the rotational speed. The use of microwave signals for performing the rotational speed measurement is advantageous because microwave signals are not absorbed or otherwise compromised due to soiling or other deposits on the blades. This method is therefore insensitive to the soiling, e.g., oil film formed due to oil leakage from the crankcase venting, which is usually present in the intake line of an internal combustion engine. This therefore constitutes a substantial advantage in comparison with the use of optical signals as the measuring signal.

In addition, modulation of the reflected measuring signal may be analyzed to determine the information about the rotational speed. A value of the transmitted measuring signal and a value of the reflected measuring signal in the time domain may be multiplied by one another to obtain a product signal having a sum signal and a differential signal, the sum signal being filtered out and the rotational speed being ascertained from the differential signal, taking into account the number of blades. In particular, the product signal may be analyzed with the aid of a Fourier analysis to determine the frequency of the differential signal as the information about the rotational speed.

According to another specific embodiment, error information may be provided if the rotational speed of the compressor impeller exceeds a rotational speed threshold value.

A threshold value comparison with the evaluation information may be performed, in which error information is stored and/or output as a function of the result of the threshold value comparison.

As an alternative, it is possible to provide for a change in the frequency (which occurs because of a Doppler effect due to the movement of a blade) of the reflected measuring signal with respect to the transmitted measuring signal, to determine the information about the rotational speed.

In addition, a phase offset between the emitted measuring signal and the reflected measuring signal may be used to ascertain a change in position of the compressor impeller, wherein the information about the rotational speed is ascertained by evaluating the change in position within a predetermined period of time.

According to another specific embodiment, the microwave measuring signal may be sent to a first compressor impeller of a first compressor, so that the microwave measuring signal is reflected on the revolving blades of the first compressor impeller as they pass, the microwave measuring signal being sent to a second compressor impeller of a second compressor, so that the microwave measuring signal is reflected on the revolving blades of the second compressor impeller, so that the microwave measuring signal reflected by one or more blades of the first compressor impeller is detected in a first time window, and the microwave measuring signal reflected by one or more blades of the second compressor impeller is detected in a second time window, the information about the rotational speeds of the first and second compressor impellers being determined as a function of the particular reflected microwave measuring signals.

In addition, the microwave measuring signal may be directed alternately at the first compressor impeller in the first time window and at the second compressor impeller in the second time window.

In particular, the first and second time windows may be selected in alternation, so that the durations of the first and second time windows are selected as a function of a particular set compressor capacity of the first and second compressors.

According to another aspect, a device is provided for determining information about a rotational speed of a compressor, in particular of a turbocharger. This device includes:

a signal source for providing a microwave measuring signal, which is directed at a compressor impeller of the compressor, so that the microwave measuring signal is reflected on the blades of the compressor impeller as they pass by;

a sensor element for detecting the microwave measuring signal reflected by one or more blades;

a control unit for determining the information about the speed as a function of the reflected microwave measuring signal.

According to another specific embodiment, the device may include one or more antennas to send the microwave measuring signal to a first compressor impeller of a first compressor, so that the microwave measuring signal is reflected on revolving blades of the first compressor impeller and to send the microwave measuring signal to a second compressor impeller of a second compressor, so that the microwave measuring signal is reflected on revolving blades of the second compressor impeller; the sensor element is designed to detect in a first time window the microwave measuring signal reflected by one or more blades of the first compressor impeller, and in a second time window to detect the microwave measuring signal reflected by one or more blades of the second compressor impeller; the control unit is designed to determine the information about the rotational speeds of the first and second compressor impellers as a function of the reflected microwave measuring signals in each case.

In addition, the antenna may include an array antenna, which is triggered by the signal source in such a way that the microwave measuring signal is alternately directed at the first compressor impeller in the first time window and at the second compressor impeller in the second time window.

The control unit may be designed to alternately select the first and the second time windows, the durations of the first and second time windows being selected as a function of a particular set compressor capacity of the first and second compressors.

In addition, it may be provided that the signal source and the sensor element are situated with respect to an intake manifold for the compressor to inject the microwave measuring signal into the intake manifold and to receive the reflected microwave measuring signal by the sensor element, the microwave measuring signal being reflected at least once on the intake manifold and/or penetrating through a wall of the intake manifold once. In particular, the intake manifold may be made of an electrically conductive material, or reflective sites formed by applying an electrically conductive layer to the nonconductive intake manifold may be provided on the wall of the intake manifold.

According to another aspect, a computer program is provided, containing a program code, which executes the above method when run on a data processing unit.

Specific embodiments are described in greater detail below with reference to the accompanying drawings.

BRIEF DESCRIPTION OF THE DRAWINGS

FIG. 2 shows output signals of a sensor element as compressor blades pass by.

FIG. 5 shows a schematic diagram of an engine system having a compressor having two turbocharging units.

FIG. 6 shows a block diagram of the measurement of the rotational speeds of the two turbocharging units of the engine system from FIG. 5.

DETAILED DESCRIPTION

The following specific embodiments are described on the basis of a turbocharger for automotive applications. However, the following description may be applied to any type of compressor in which a medium is drawn in by a compressor impeller using blades and is compressed to a higher pressure.

Figure 1A:
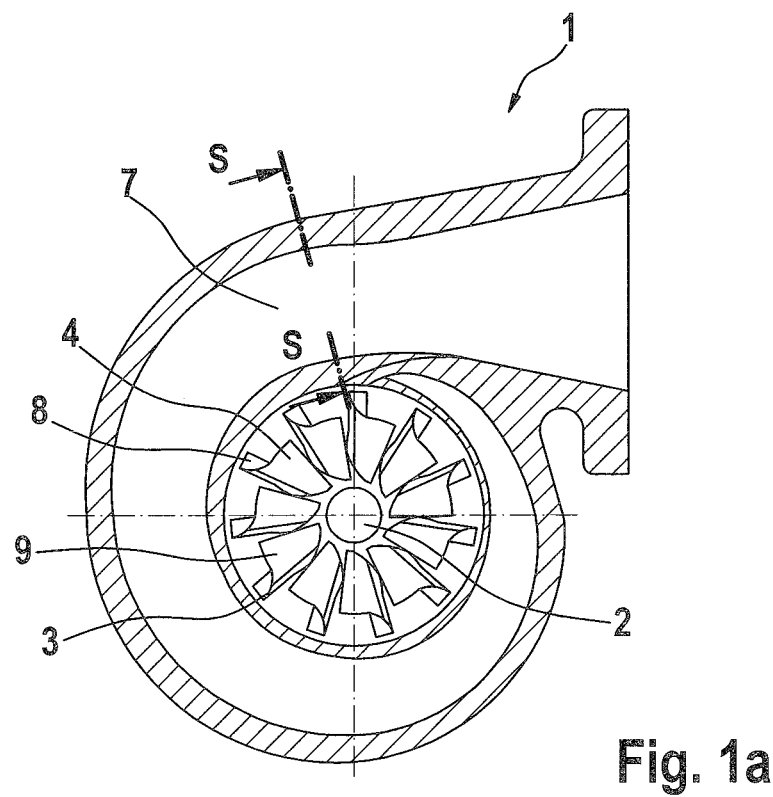
FIG. 1a shows a sectional view through a turbocharger in the axial direction, i.e., along sectional line S-S.
Figure 1B:
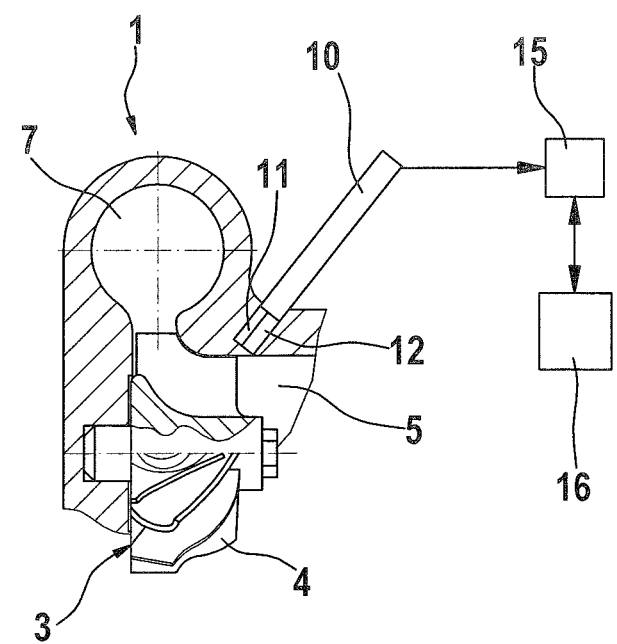
FIG. 1b shows another sectional view through a turbocharger in the axial direction, i.e., along sectional line S-S.

FIG. 1a shows a cross-sectional diagram through a turbocharger 1 at a right angle to an axial direction of a shaft 2, which is rotatably mounted in a turbocharger housing. FIG. 1b shows a sectional diagram along line S-S of FIG. 1a in the direction of the arrow.

Turbocharger 1 has a compressor impeller 3 having blades 4 and situated on shaft 2. Air is drawn in via an intake opening 5 in the axial direction of shaft 2 by rotation of compressor impeller 3 in turbocharger 1, is compressed by blades 4 of compressor impeller 3 and ejected via an exhaust port 7, which is situated in a spiral pattern around compressor impeller 3.

Compressor impeller 3 has a blade web 8 for each blade 4, the blade web supporting a blade 9 protruding axially away from the blade web 8 and additionally having a curvature in the direction of the direction of rotation of compressor impeller 3.

A measuring device 10 is fixedly situated in the housing of turbocharger 1, this measuring device being suitable for non-contact detection of the passing of an outer edge of blades 9. The placement of measuring device 10 must be selected so that measuring signals may be transmitted between measuring device 10 and the blade ends (tips) with virtually no interference.

Measuring device 10 includes a signal source 11 for transmitting a microwave signal in the direction of blades 9. The measuring signal is such that it may be reflected by one or more positions of the blade ends of blades 9. The microwaves represent an electromagnetic signal having a frequency in the range of 300 MHz to approximately 300 GHz. The signal source may be provided for emitting radar waves.

Measuring device 10 also includes a sensor element 12 to detect the microwave measuring signals reflected by the blade ends of blades 9. Sensor element 12 is adapted accordingly to the type of microwave measuring signal emitted by signal source 11. In other words, when signal source 11 emits a radar signal as an electromagnetic signal, sensor element 12 is a radar wave sensor.

Signal source 11 and sensor element 12 of measuring device 10 may be designed so they are integrated, i.e., a transceiver element is provided and is connected to a suitable mixer to emit its microwave measuring signal in the direction of blade wheels 9 and at the same time to detect the reflected microwave measuring signals. With the aid of the mixer, the measuring signal emitted and the reflected measuring signals are separated from one another, so that the reflected microwave measuring signal may be evaluated separately.

Measuring device 10 is connected to a control unit 15. Control unit 15 receives a microwave signal representing the reflected microwave measuring signals from sensor element 12 and performs an evaluation of the reflected microwave signal.

Sensor element 12 supplies a corresponding electrical variable such as a voltage signal or a current signal as the electrical measuring signal whose amplitude corresponds to an intensity of the reflected microwave signal.

It is possible to provide for an excessive speed of compressor impeller 3 of turbocharger 1 to be detected and for the corresponding information to be stored. If rotational speed n of compressor impeller 3 of turbocharger 1 exceeds a predefined rotational speed threshold value for a maximum rotational speed, this may be recorded, output in a suitable manner, or stored in a memory unit 16 for later retrieval.

Figure 2:
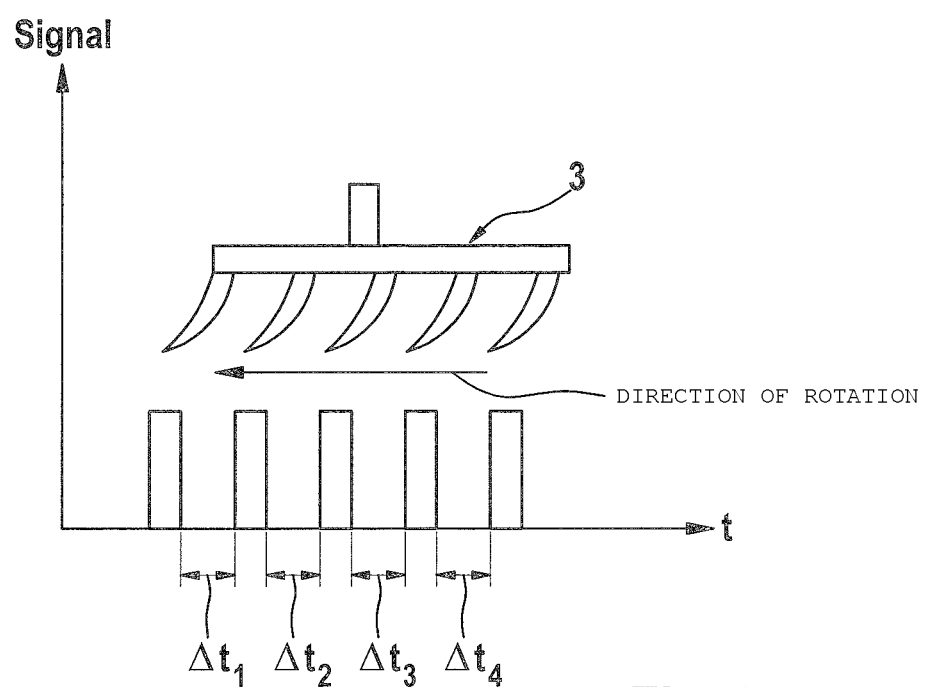

At a constant rotational speed n of compressor impeller 3 and for measuring signal pulses synchronized with rotational speed n of compressor impeller 3, sensor element 12 supplies a periodic signal having pulses at equidistant intervals from one another, as shown in FIG. 2, as the reflected measuring signal in the ideal case. The individual pulses have the same amplitudes with respect to the transmitted measuring signal in the case of a non-defective compressor impeller 3.

Figure 3:
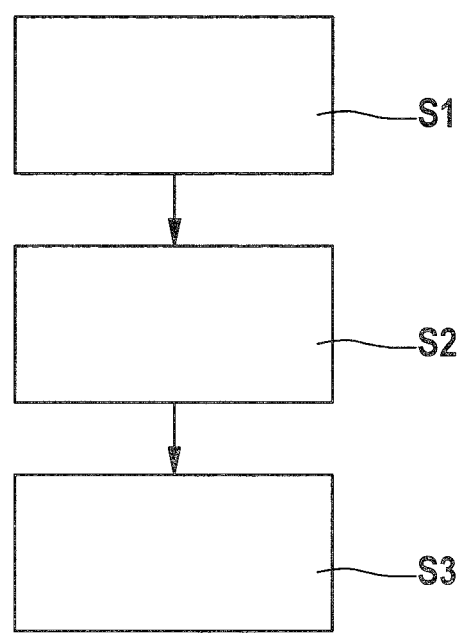
FIG. 3 shows a flow chart to illustrate a method for diagnosing a turbocharger.

With respect to FIG. 3, signal source 11 outputs a microwave measuring signal (S1), which is transmitted to compressor impeller 3. The transmitted measuring signal is modulated by the passage of blades 9 in that the microwave measuring signal is reflected back onto sensor element 12 as a function of a particular determined position of the blade ends of blades 9, which have a certain angle of inclination with respect to signal source 11 and sensor element 12. The passage of the blade ends of blades 9 thus causes a fluctuation in the intensity of the reflected microwave signal received in sensor element 12. Sensor element 12 receives the reflected measuring signal (S2) and converts the received reflected measuring signal into an electrical signal, which may be a voltage signal or a current signal, and relays this to a control unit 15.

As compressor impeller 3 rotates, this yields a measuring signal having signal pulses corresponding to the fluctuations in intensity of the reflected microwave signal due to the passage of blades 9 past measuring device 10. Rotational speed n of compressor impeller 3 may be derived from the interval of time between the signal pulses (step 3). Furthermore, wear in the bearings of turbocharger 1 or information about the condition of turbocharger 1 in general may be derived from fluctuations in the intervals between the signal pulses of the measuring signal.

Figure 4:
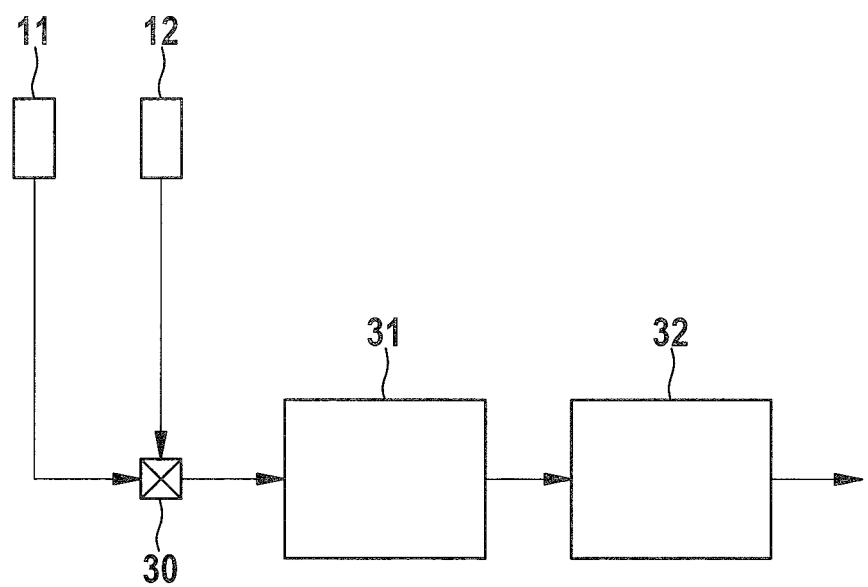
FIG. 4 shows a schematic diagram of the measurement principle for ascertaining the rotational speed of the compressor impeller by evaluating the modulated measuring signal.

The measurement principle is diagramed schematically in FIG. 4. Signal source 11 supplies, in addition to the microwave measuring signal emitted, an electrical frequency signal having a frequency corresponding to the signal frequency. The electrical frequency signal is sent to a multiplier 30. Multiplier 30 is also connected to sensor element 12 and receives from sensor element 12 an electrical conversion of the received microwave signal as a measuring signal. Multiplication yields a product signal containing the sum frequency and the differential frequency of the electrical signals transmitted by signal source 11 and by sensor element 12.

The sum frequency is filtered out with the aid of a low-pass filter 31 having a suitable cutoff frequency between the frequency of the measuring signal and double the frequency of the measuring signal. A downstream high-pass filter 32 is designed to allow the differential frequency to pass. Low-pass filter 31 and high-pass filter 32 are designed so that the minimum rotational speed to be detected and the maximum rotational speed of the turbocharger to be detected or the frequencies of the resulting product signal representing these variables are allowed to pass through.

A frequency signal whose frequency is proportional to the rotational speed may be picked up at the output of high-pass filter 32. If the frequency of the frequency signal is divided by the number of blades on the compressor impeller, this directly yields a value in revolutions per second. This may be performed in control unit 15. It holds in particular that $n=(f\_send-f\_empf) \times 60/a$, where n is the rotational speed in $(min^{-1})$, f_send is the frequency of the transmitted measuring signal, f_empf is the frequency of the measuring signal received, and a is the number of blades.

The evaluation of the resulting frequency signal at the output of high-pass filter 32 may be performed using a fast Fourier transform or a conversion to a pulse signal.

The evaluation of the reflected microwave measuring signal may also be based on a frequency signal or a phase signal. With respect to the frequency signal, a frequency modulation performed on the basis of a Doppler effect may be evaluated. The Doppler effect may be used because there is a periodic movement of the area on blades 9 where the microwave signal strikes, this movement being in the direction of the measuring signal because of the angle inclination of blades 9 with respect to the direction of the measuring signal transmitted from the signal source. The frequency of the microwave measuring signal is therefore modulated according to the Doppler effect, which may then be analyzed in control unit 15.

In addition, the modulation of the phase of the microwave measuring signal may be evaluated. In this case the microwave measuring signal is directed at an area of compressor impeller 3 through which blades 9 move. Depending on the position of blades 9, the area is offset with respect to the direction of propagation of the microwave measuring signal. In other words, the phase offset between the transmitted microwave measuring signal and the received microwave measuring signal depends on the position of the compressor impeller. The rotational speed of compressor impeller 3 may be determined by evaluating the change in position.

The corresponding phase signal may be evaluated using a phase modulation according to the PLL method in particular. This may be performed, for example, with the aid of a controlled oscillator via a phase locked loop to which the rotational speed-proportional reflected measuring signal is coupled. The controlled oscillator is triggered as a function of a phase difference between the signal output by the output signal of the controlled oscillator and the reflected measuring signal, the control signal for the oscillator providing information about the rotational speed of the compressor impeller.

FIG. 5 shows a schematic diagram of an engine system 20 having a multistage compressor unit 24. Engine system 20 includes an internal combustion engine 21, which receives air via an air supply section 22 and from which the combustion exhaust gas is removed via an exhaust gas removal section 23. In the present example, multistage turbocharging unit 24 has two turbocharging units 25, 26 situated in series in air supply section 22 and exhaust gas removal section 23. In alternative specific embodiments, the turbocharging units may also be situated in parallel to one another in air supply section 22 and in exhaust gas removal section 23. Each turbocharging unit 25, 26 has its own turbine wheel 27, which is driven by the exhaust gas stream of combustion exhaust gas and drives a corresponding compressor impeller 28. Turbocharging units 25, 26 are each coupled to a waste gas valve 29, in a particular bypass line 30, to adjust the compressor capacity of particular turbocharging unit 25, 26. Turbocharging units 25, 26 are integrated structurally into turbocharging device 24. A measuring device 31 having a signal source 32 for generating the measuring signal, and a sensor element 33 for receiving a reflected measuring signal is provided. Measuring device 31 is connected to a control unit 34, which controls measuring device 31.

FIG. 6 shows a schematic diagram of a system for ascertaining rotational speeds of turbocharging units 25, 26 of a multistage turbocharging device 24. Control unit 34 is connected to signal source 32 to initiate the supply of a microwave signal or to support the generation of the measuring signal. Signal source 32 is connected to a first antenna 35 and a second antenna 36 to transmit the measuring signal. First antenna 35 directs the measuring signal to compressor impeller 28 of first turbocharging unit 25, and second antenna 36 directs the measuring signal to compressor impeller 28 of second turbocharging unit 26. The measuring signal is an electromagnetic signal such as a microwave signal, a radio signal, or the like.

The measuring signal is reflected by the blades of compressor impellers 28 of both turbocharging units 25, 26 and is received by first and second antennas 35, 36, respectively.

The received reflected measuring signal is transmitted to sensor element 33 of measuring device 31.

Sensor element 33, controlled by control unit 34, evaluates the measuring signal received by first turbocharging unit 17 in a first time window and evaluates the measuring signal received by second turbocharging unit 18 in a second time window. The first and second time windows may be defined as alternating. During operation of turbocharging device 24 having two turbocharging units 25, 26, the rotational speeds of both turbocharging units 25, 26 are measured alternately by sensor unit 12 and the rotational speed information is provided in control unit 34 and/or communicated to an engine control unit.

Alternating reception of the reflected measuring signal may be accomplished by alternating querying of first antenna 35 and second antenna 36 by sensor unit 32. For example, one of antennas 35, 36 may be connected to sensor unit 32 by a suitable multiplexer in sensor unit 32, which may be designed to be controllable by control unit 34, for example. The received measuring signal may be easily provided in sensor unit 33 by switching to corresponding antenna 35, 36.

Figure 7:
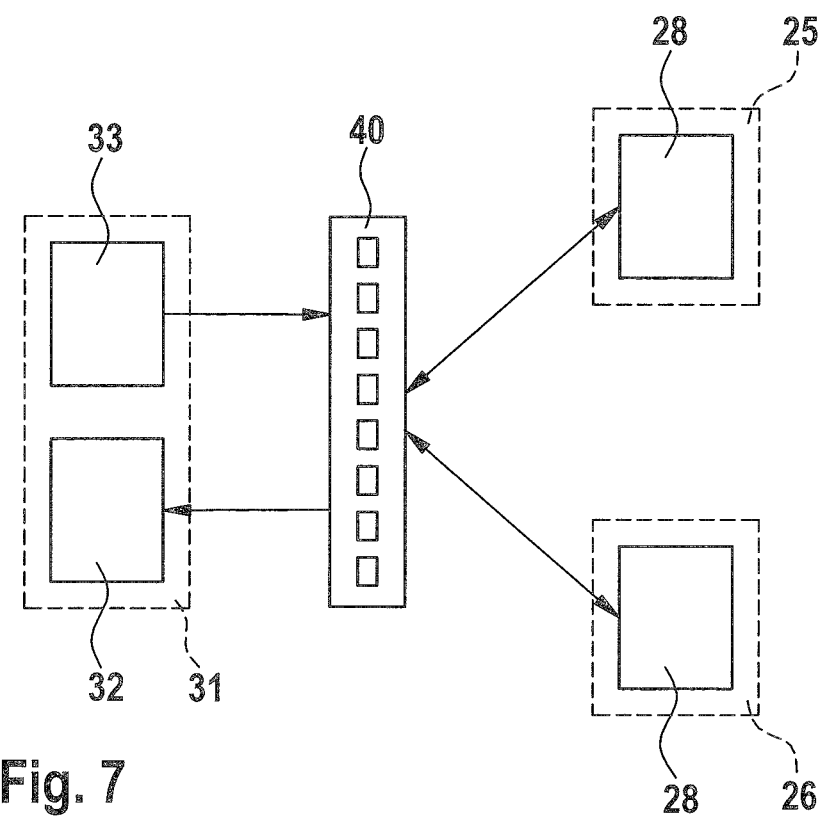
FIG. 7 shows a block diagram of another specific embodiment of the measurement of the rotational speeds of the two turbocharging units of the engine system of FIG. 5.

In an alternative specific embodiment, measuring device 31 may also be connected to an array antenna 40 instead of individual antennas 35, 36. This is diagramed schematically in FIG. 7. The array antenna may be triggered by signal source 32 in a known manner using measuring signals of different phase angles, so that the direction of the electromagnetic measuring signal emitted (direction of the highest antenna gain) is directed at compressor impeller 28 whose rotational speed is to be measured. The individual phase angles are determined by triggering of suitable mechanical or electrical elements by control unit 34. By varying the phase angle of the measuring signals, the directional effect of the array antenna may be adjusted so that it is aligned with compressor impeller 28 on which the measurement is to be performed. This method is applicable in particular when using microwaves as measuring signals.

Since array antenna 40 cannot emit the measuring signal simultaneously in two different directions, control unit 34 must synchronize signal source 32 and sensor unit 33 to one another, so that in the first time window, signal source 32 supplies the measuring signal to array antenna 40 so that the measuring signal is directed to compressor impeller 28 of first turbocharging unit 25 and sensor unit 33 receives the measuring signals received by the array antenna from the direction of compressor impeller 28 of first turbocharging unit 25. In addition, control unit 34 may trigger signal source 32 so that in the second time window the measuring signal is transmitted by array antenna 40 accordingly in such a way that the measuring signal is directed at compressor impeller 28 of second turbocharging unit 26. The received measuring signals are then evaluated in sensor unit 33 during the second time window.

The received measuring signal may be evaluated in the manner described above by evaluating the frequency of the signal modulated by the movement of compressor impeller 28.

Alternatively, it is conceivable to use evaluation methods in which a speed of movement of a blade of the compressor impeller is evaluated by a frequency difference between the transmitted measuring signal and the received measuring signal on the basis of the Doppler effect in a known way. Rotational speed n is obtained from:

$$n=[(f'/f-1)c]/2\pi r,$$

where f' denotes the frequency of the received measuring signal, f is the frequency of the transmitted measuring signal, c is the speed of light, and r is the distance of the measuring point at which the measuring signal is reflected on the blade of compressor impeller 28 from the axis of rotation of compressor impeller 28.

Furthermore, it is also possible to provide for the durations of the time windows for measuring compressor impellers 28 of first and second turbocharging units 25, 26 to be controlled as a function of the engine operating point. For example, if only one turbocharging unit 25, 26 in turbocharging device 24 is active and the other turbocharging unit is switched to inactive mode by corresponding waste gate valve 29, the rotational speed in active turbocharging unit 25, 26 may be measured through a corresponding choice of particular antenna 35, 36 or the alignment of the measuring signal with the aid of array antenna 40 with compressor impeller 28 of active turbocharging unit 25, 26 exclusively, more commonly or for durations longer than the durations of the particular other time window.

The use of a single signal source and a single sensor element for evaluating the rotational speeds of two turbocharging units of a turbocharging device is to be implemented in a less complicated manner. In particular, high-frequency modules for generating microwaves and for processing received signals are simple to design. Since a single rotational speed measurement may be performed within a very narrow time window in comparison with the dynamics of the change in rotational speed, the rotational speed signal is suitable for controlling the turbocharging device in real time to an unlimited extent.

Figure 8A:
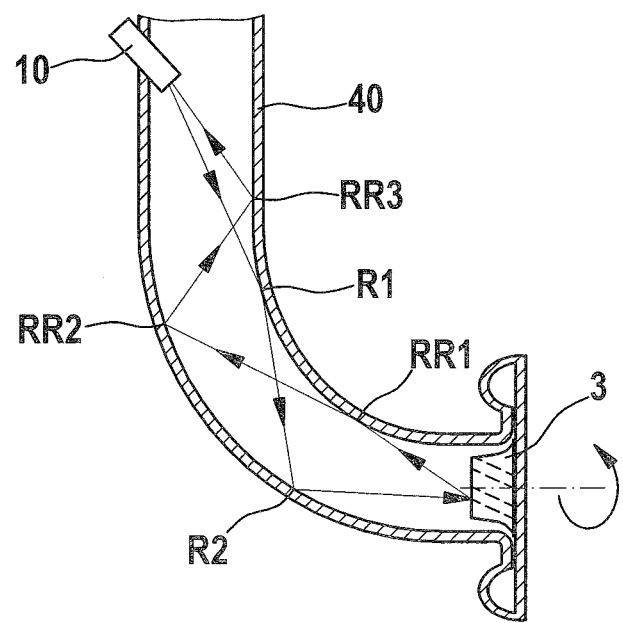
FIG. 8 shows a schematic diagram of another option for the layout of the signal source and the sensor element according to another specific embodiment.
Figure 8B:
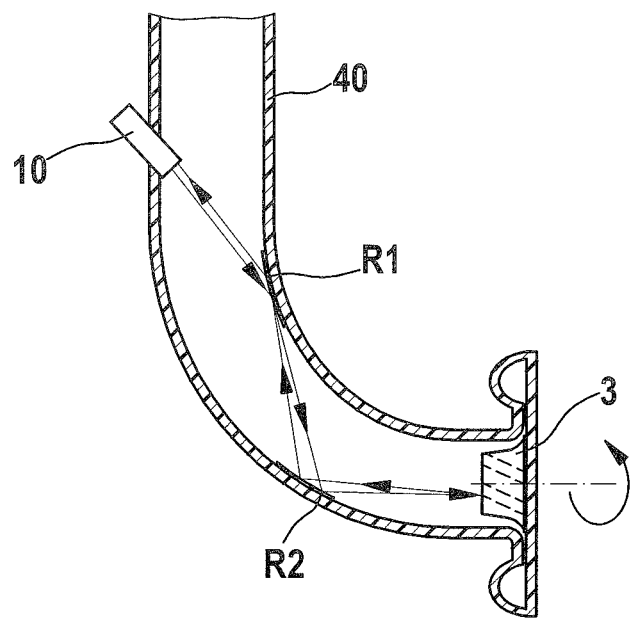

FIGS. 8a and 8b show another possibility for the placement of measuring device 10. As shown in FIGS. 8a and 8b, measuring device 10 is situated at a distance from compressor impeller 3 on an intake manifold 40 for supplying the air to be compressed by compressor impeller 3. In the specific embodiments of FIGS. 8a and 8b, measuring device 10 is installed in a wall of intake manifold 40, so that the transmitted and reflected measuring signals may be received in the interior of intake manifold 40. Measuring device 10 may also transmit the measuring signal to compressor impeller 3 both directly and indirectly. In the specific embodiments of FIGS. 8a and 8b, the transmitted measuring signal is reflected one or more times on the wall of intake manifold 40. To do so, it is possible to provide for the intake manifold to be made of a material which is reflective for the measuring signal, which may be an electrically conductive material, in particular made of a metal. The specific embodiment in FIG. 8a shows that the transmitted measuring signal is reflected at reflective sites R1 and R2, so that it is directed at a predefined position on compressor impeller 3. The reflected measuring signal may be reflected back to measuring device 10 along essentially the same path as the transmitted measuring signal or it may propagate through intake manifold 40 in some other way and be reflected back to measuring device 10 at additional reflective sites RR1, RR2 and RR3, for example.

Whereas the specific embodiment of FIG. 8a represents the case of a metallic or electrically conductive intake manifold 40, FIG. 8b illustrates a specific embodiment in which the intake manifold is made of a nonconductive material and thus is essentially transparent for the transmitted microwave measuring signal. To nevertheless achieve reflections on reflective sites R1 and R2, it is possible to provide for intake manifold 40 to be furnished with reflective surfaces at reflective sites R1, R2. For example, metallic surfaces may be applied to the inside of intake manifold 40 by either gluing or coating. Since the material of intake manifold 40 is transparent for microwave measuring signals, the coating or the application of the reflective areas may also be performed on the outside of intake manifold 40.

Figure 9:
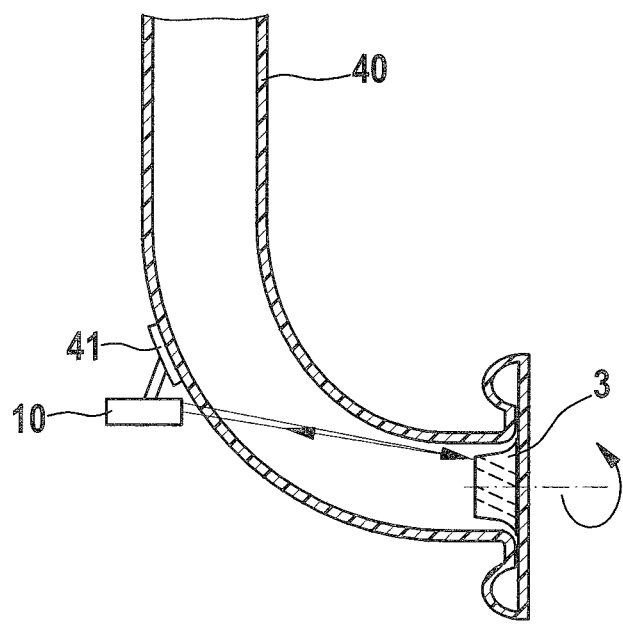
FIG. 9 shows a schematic diagram of another option for the placement of the signal source and the sensor element for measuring a rotational speed of a turbocharging unit of an engine system.

FIG. 9 shows another specific embodiment, in which measuring device 10 is situated outside of intake manifold 40. In this case, intake manifold 40 is also designed to be nonconductive, so that the microwave measuring signals are able to penetrate through intake manifold 40. In the specific embodiment shown in FIG. 9, measuring device 10 is situated in such a way that the transmitted microwave measuring signal is directed at compressor impeller 3 directly, i.e., without reflection in intake manifold 40.

Measuring device 10 may be mounted in intake manifold 40 with the aid of a suitable mount 41. Measuring device 10 may of course also be mounted on other components.

Figure 10A:
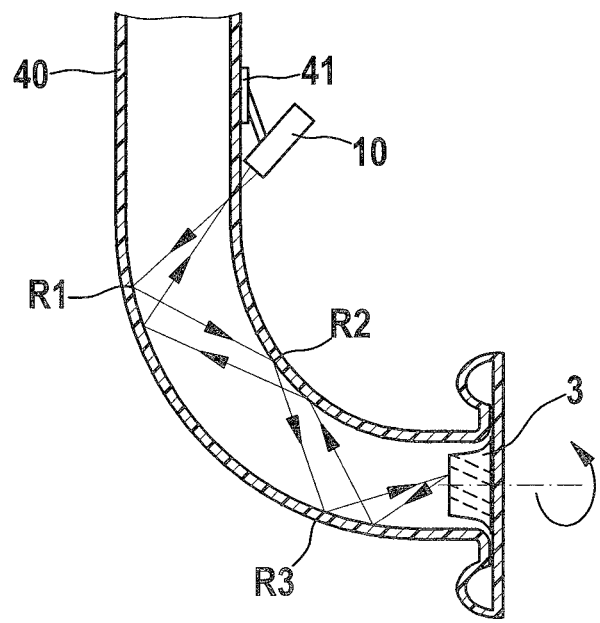
FIG. 10a shows a schematic diagram of an option for the placement of the signal source and the sensor element for measuring a rotational speed of a turbocharging unit of an engine system.
Figure 10B:
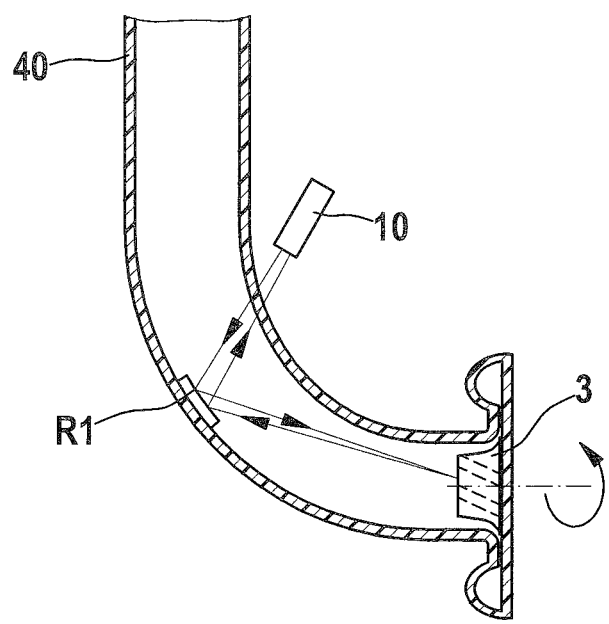
FIG. 10b shows a schematic diagram of another option for the placement of the signal source and the sensor element for measuring a rotational speed of a turbocharging unit of an engine system.

The specific embodiments in FIGS. 10a and 10b essentially correspond to a combination of the features of specific embodiments of FIGS. 8a and 8b as well as FIG. 9. The specific embodiments of FIGS. 10a and 10b show a measuring device 10, which is installed outside of intake manifold 40 and directs the microwave measuring signal through an area of intake manifold 40 which is transparent for the microwave measuring signal and into the interior of intake manifold 40, where the microwave measuring signal is reflected on several reflective sites R1-R3 and is thus directed at a certain area of compressor impeller 3.

In a specific embodiment in FIG. 10a, the area of intake manifold 40 is designed to be electrically conductive downstream from the position where measuring device 10 injects the measuring signal into intake manifold 40, i.e., it is provided here with an electrically conductive layer on the inside or outside, for example, so that both the transmitted microwave measuring signal and the reflected microwave measuring signal are guided in the interior of intake manifold 40. In the specific embodiment in FIG. 10a, the reflected microwave measuring signal is then also directed at measuring device 10 if the signal has a different beam path from the transmitted microwave measuring signal. In contrast, in the specific embodiment in FIG. 10b, the reflective site is locally limited, so that essentially the reflected microwave measuring signals are reflected back to the measuring device only when the beam path corresponds essentially to the beam path of the transmitted microwave measuring signal.

Alternatively, intake manifold 40 may be provided in at least two parts in which a plastic intake manifold opens into a corresponding metal pipe ending at compressor impeller 3. Measuring device 10 may be situated outside of the plastic pipe, so that measuring device 10 directs the measuring signal through the plastic intake manifold into the metal pipe. In principle, the specific embodiments of FIGS. 8 through 10 may be combined with the devices described previously for measuring the rotational speed.

What is claimed is:

1. A method for determining information about a rotational speed of a compressor, which is a turbocharger, the method comprising:
    providing a measuring signal, which is a microwave measuring signal, which is directed at a compressor impeller of the compressor, so that the measuring signal is reflected on revolving blades of the compressor impeller;
    detecting the measuring signal reflected by at least one of the revolving blades; and
    determining information about the rotational speed as a function of the reflected measuring signal;
    evaluating a modulation of the reflected measuring signal to determine the information about the rotational speed;
    multiplying the transmitted measuring signal and the reflected measuring signal to obtain a product signal including a sum signal and a differential signal;
    filtering out the differential signal; and
    ascertaining the rotational speed from the differential signal, taking into account the number of the blades.

2. The method of claim 1, wherein the product signal is analyzed with the aid of a Fourier analysis to determine the frequency of the differential signal as the information about the rotational speed.

3. The method of claim 1, wherein error information is provided when the rotational speed of the compressor impeller exceeds a rotational speed threshold value.

4. The method of claim 1, wherein a threshold value comparison is performed using the information about the rotational speed, and wherein error information is at least one of stored and output as a function of a result of the threshold value comparison.

5. The method of claim 1, wherein a change in frequency of the reflected measuring signal, occurring because of a Doppler effect due to movement of one of the blades, is evaluated with respect to the transmitted measuring signal to determine the information about the rotational speed.

6. The method of claim 1, wherein a change in position of the compressor impeller is ascertained from a phase offset between the transmitted measuring signal and the reflected measuring signal, wherein the information about the rotational speed is ascertained by evaluating the change in position within a predetermined period of time.

7. The method of claim 1, wherein:
the measuring signal is transmitted to a first compressor impeller of a first compressor, so that the measuring signal is reflected on revolving blades of the first compressor impeller,
the measuring signal is sent to a second compressor impeller of a second compressor, so that the measuring signal is reflected on revolving blades of the second compressor impeller,
the measuring signal reflected by at least one blade of the first compressor impeller is detected in a first time window, and the measuring signal reflected by at least one blade of the second compressor impeller is detected in a second time window, and
information about the speed of the first compressor impeller and the speed of the second compressor impeller is determined as a function of the particular reflected measuring signals.

8. The method of claim 7, wherein the measuring signal is alternately directed at the first compressor impeller in the first time window and at the second compressor impeller in the second time window.

9. A method for determining information about a rotational speed of a compressor, which is a turbocharger, the method comprising:
providing a measuring signal, which is a microwave measuring signal, which is directed at a compressor impeller of the compressor, so that the measuring signal is reflected on revolving blades of the compressor impeller;
detecting the measuring signal reflected by at least one of the revolving blades; and
determining information about the rotational speed as a function of the reflected measuring signal;
transmitting the measuring signal to a first compressor impeller of a first compressor, so that the measuring signal is reflected on revolving blades of the first compressor impeller;
sending the measuring signal to a second compressor impeller of a second compressor, so that the measuring signal is reflected on revolving blades of the second compressor impeller;
detecting the measuring signal reflected by at least one blade of the first compressor impeller in a first time window;
detecting the measuring signal reflected by at least one blade of the second compressor impeller in a second time window;
determining information about the speed of the first compressor impeller and the speed of the second compressor impeller as a function of the particular reflected measuring signals;
selecting, in alternation, the first time window and the second time window; and
selecting the durations of the first time window and the second time window as a function of a particular set compressor capacity of the first compressor and the second compressor.

10. A device for determining information about a rotational speed of a compressor, which is a turbocharger, comprising:
a signal source for supplying a measuring signal, which is a microwave measuring signal, which is directed at a compressor impeller of the compressor, so that the measuring signal is reflected on revolving blades of the compressor impeller;
a sensor element for detecting the measuring signal reflected by at least one blade; and
a control unit for determining the information about the rotational speed as a function of the reflected measuring signal, by performing the following:
evaluating a modulation of the reflected measuring signal to determine the information about the rotational speed;
multiplying the transmitted measuring signal and the reflected measuring signal to obtain a product signal including a sum signal and a differential signal;
filtering out the differential signal; and
ascertaining the rotational speed from the differential signal, taking into account the number of the blades.

11. The device of claim 10, comprising:
at least one antenna for transmitting the measuring signal to a first compressor impeller of a first compressor, so that the measuring signal is reflected on revolving blades of the first compressor impeller, and for transmitting the measuring signal to a second compressor impeller of a second compressor, so that the measuring signal is reflected on revolving blades of the second compressor impeller;
wherein the sensor element is configured to detect in a first time window the measuring signal reflected by at least one blade of the first compressor impeller and to detect in a second time window the measuring signal reflected by at least one blade of the second compressor impeller, and
the control unit is configured to determine information about the rotational speeds of the first compressor impeller and the second compressor impeller as a function of the particular reflected measuring signals.

12. The device of claim 11, wherein the antenna includes an array antenna, which is triggered by the signal source, so that the measuring signal is alternately directed to the first compressor impeller in the first time window and to the second compressor impeller in the second time window.

13. The device of claim 10, wherein the signal source and the sensor element are situated with respect to an intake manifold for the compressor for injecting the microwave measuring signal into the intake manifold and for receiving the reflected microwave measuring signal by the sensor element, and wherein the microwave measuring signal is at least one of reflected at least once on one of the intake manifold and penetrating once through a wall of the intake manifold.

14. The device of claim 13, wherein the intake manifold is made of an electrically conductive material or reflective sites are provided on the wall of the intake manifold, and is formed by applying an electrically conductive layer to the nonconductive intake manifold.

15. A device for determining information about a rotational speed of a compressor, which is a turbocharger, comprising:
a signal source for supplying a measuring signal, which is a microwave measuring signal, which is directed at a compressor impeller of the compressor, so that the measuring signal is reflected on revolving blades of the compressor impeller;
a sensor element for detecting the measuring signal reflected by at least one blade; and
a control unit for determining the information about the rotational speed as a function of the reflected measuring signal;
at least one antenna for transmitting the measuring signal to a first compressor impeller of a first compressor, so that the measuring signal is reflected on revolving blades of the first compressor impeller, and for transmitting the measuring signal to a second compressor impeller of a second compressor, so that the measuring signal is reflected on revolving blades of the second compressor impeller;

wherein:
the sensor element is configured to detect in a first time window the measuring signal reflected by at least one blade of the first compressor impeller and to detect in a second time window the measuring signal reflected by at least one blade of the second compressor impeller;

the control unit is configured to determine information about the rotational speeds of the first compressor impeller and the second compressor impeller as a function of the particular reflected measuring signals;

the control unit is configured to alternately select the first time window and the second time window; and the durations of the first time window and the second time window are selected as a function of a particular set compressor capacity of the first and second compressors.

16. A non-transitory computer readable medium having a computer program, which is executable by a processor, comprising:

a program code arrangement having program code for determining information about a rotational speed of a compressor, which is a turbocharger, by performing the following:

providing a measuring signal, which is a microwave measuring signal, which is directed at a compressor impeller of the compressor, so that the measuring signal is reflected on revolving blades of the compressor impeller;

detecting the measuring signal reflected by at least one of the revolving blades; and determining information about the rotational speed as a function of the reflected measuring signal;

evaluating a modulation of the reflected measuring signal to determine the information about the rotational speed;

multiplying the transmitted measuring signal and the reflected measuring signal to obtain a product signal including a sum signal and a differential signal;

filtering out the differential signal; and ascertaining the rotational speed from the differential signal, taking into account the number of the blades.

* * * * *